(12) United States Patent
Tutt et al.

(10) Patent No.: US 8,778,589 B2
(45) Date of Patent: Jul. 15, 2014

(54) DIGITAL MANUFACTURE OF AN OPTICAL WAVEGUIDE

(75) Inventors: Lee W. Tutt, Webster, NY (US); Donna P. Suchy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 688 days.

(21) Appl. No.: 12/569,985

(22) Filed: Sep. 30, 2009

(65) Prior Publication Data

US 2011/0076611 A1    Mar. 31, 2011

(51) Int. Cl.
*H01B 11/00* (2006.01)
*H01P 11/00* (2006.01)

(52) U.S. Cl.
CPC ............ *H01P 11/003* (2013.01); *H01P 11/001* (2013.01)
USPC ...................................................... 430/120.2

(58) Field of Classification Search
CPC .... G02B 6/0065; H01P 11/001; H01P 11/003
USPC ....................................................... 430/120.2
See application file for complete search history.

(56) References Cited

U.S. PATENT DOCUMENTS

| | | |
|---|---|---|
| 4,965,131 A | 10/1990 | Nair et al. |
| 5,707,684 A | 1/1998 | Hayes et al. |
| 5,778,295 A | 7/1998 | Chen et al. |
| 6,567,641 B1 | 5/2003 | Aslam et al. |
| 2005/0069254 A1 * | 3/2005 | Schultheis et al. ............. 385/31 |
| 2008/0159786 A1 | 7/2008 | Tombs et al. |
| 2009/0016757 A1 | 1/2009 | Priebe et al. |
| 2009/0142100 A1 | 6/2009 | Suchy et al. |
| 2009/0195778 A1 | 8/2009 | Yankov |

* cited by examiner

*Primary Examiner* — Christopher Rodee
(74) *Attorney, Agent, or Firm* — David A. Novais

(57) ABSTRACT

The electrographic printing of one or more multi-channeled layers having a particular pattern by electrographic techniques that produces a three-dimensional optical waveguide electrographically. Such electrographic printing comprises the steps of forming a desired print image, electrographically, on a receiver member utilizing predetermined sized marking particles; and, where desired, forming one or more final multi-channeled layers utilizing marking particles of a predetermined size or size distribution.

7 Claims, 8 Drawing Sheets

DIGITAL MANUFACTURE OF AN OPTICAL WAVEGUIDE

FIELD OF THE INVENTION

The present invention relates electrographic printing and more particularly to printing a three-dimensional optical waveguide electrographically.

BACKGROUND OF THE INVENTION

One common method for printing images on a receiver member is referred to as electrography. In this method, an electrostatic image is formed on a dielectric member by uniformly charging the dielectric member and then discharging selected areas of the uniform charge to yield an image-wise electrostatic charge pattern. Such discharge is typically accomplished by exposing the uniformly charged dielectric member to actinic radiation provided by selectively activating particular light sources in an LED array or a laser device directed at the dielectric member. After the image-wise charge pattern is formed, the pigmented (or in some instances, non-pigmented) marking particles are given a charge, substantially opposite the charge pattern on the dielectric member and brought into the vicinity of the dielectric member so as to be attracted to the image-wise charge pattern to develop such pattern into a visible image.

Thereafter, a suitable receiver member (e.g., a cut sheet of plain bond paper) is brought into juxtaposition with the marking particle developed image-wise charge pattern on the dielectric member. A suitable electric field is applied to transfer the marking particles to the receiver member in the image-wise pattern to form the desired print image on the receiver member. The receiver member is then removed from its operative association with the dielectric member and the marking particle print image is permanently fixed to the receiver member typically using heat, and/or pressure and heat. Multiple layers or marking materials can be overlaid on one receiver, for example, layers of different color particles can be overlaid on one receiver member to form a multi-color print image on the receiver member after fixing.

In the earlier days of electrographic printing it was desirable to minimize channel formation during fusing. Under most circumstances, channels are considered an objectionable artifact in the print image. In order to improve image quality, and still produce channels a new method of printing has been formulated in U.S. Publication 2009/0142100. In that invention one or more multi-channeled layers are formed using electrographic techniques. The use of layered printing, including possible raised images to create channels capable of allowing movement of a fluid, such as an ink or dielectric, to provide a printed article with, among other advantages, a variety of security features on a digitally printed document.

Optical waveguides are devices which channel and constrain light to stay on designated paths. This is accomplished by using the critical angle phenomena for light traveling in a higher refractive index material. In this case, when light hits an interface at an angle above the critical angle it will be internally reflected away from the interface. If the high refractive material is located in a linear channel and light has been injected into the channel approximately parallel to the channel, the light will hit the walls only at high angles and therefore stay in the channels.

A typical example of this is the optical fiber used for communication and the entertaining light trees. Another example is the fiber optic face plate. The face plate is the equivalent of many short fiber waveguides placed next to each other. The light that enters a point on the faceplate is constrained to exit the same spot on the opposite side of the faceplate. This effectively lifts the image the distance of the thickness of the fiber faceplate.

There is a need to guide light to different locations on a plate or substrate and have those be customizable from one plate to another, custom waveguides). The analog is printed circuit boards which route electron to different devices but the routing changes when the design and devices change. It is therefore desirable for a digitally designed optical waveguides which are readily manufacturable in a simple manner. This invention solves this problem.

SUMMARY OF THE INVENTION

In view of the above, this invention is directed to electrographic printing wherein toner and/or laminates form one or more multi-channeled layers, with a particular pattern, which can be printed by electrographic techniques. Such electrographic printing includes the steps of forming a desired image, electrographically, on a receiver member and incorporating channels that are embedded into the design.

The multi layered channel printing apparatus and related method and print incorporates one or more static layers, and one or more moveable layers that allow a fluid to move through the micro channels via an opening or through a direct fill. This could be used with a variety of fluids which have a higher refractive index than the layers or substrate. These fluids can be solidified or left as a fluid. An optional capping layer or substrate may then also be applied.

The invention, and its objects and advantages, will become more apparent in the detailed description presented below.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures.

In the detailed description of the preferred embodiment of the invention presented below, reference is made to the accompanying drawings, in which.

DETAILED DESCRIPTION OF THE INVENTION

Figure 1:
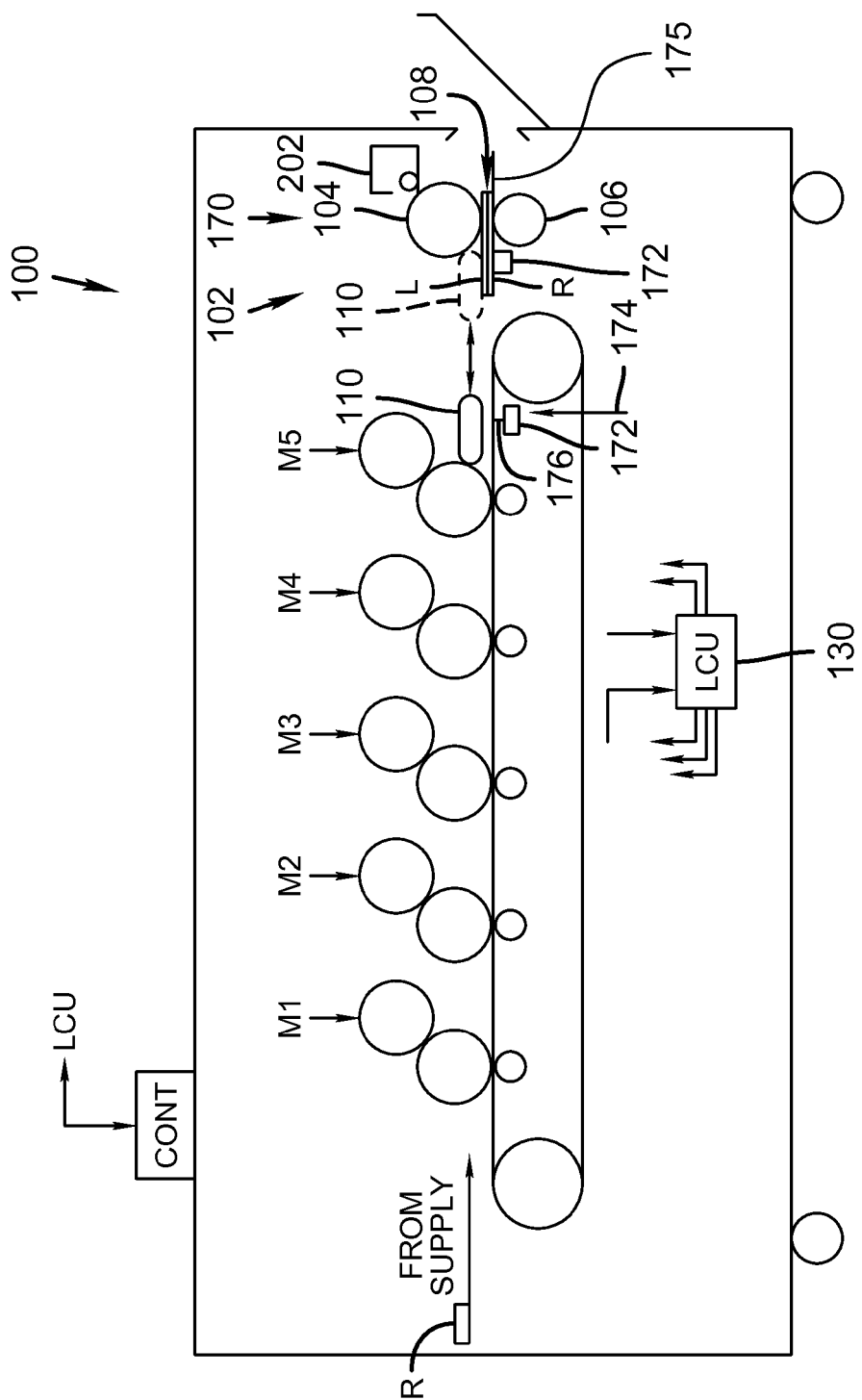
FIG. 1 is a schematic side elevational view, in cross section, of a typical electrographic reproduction apparatus suitable for use with this invention.
Figure 2:
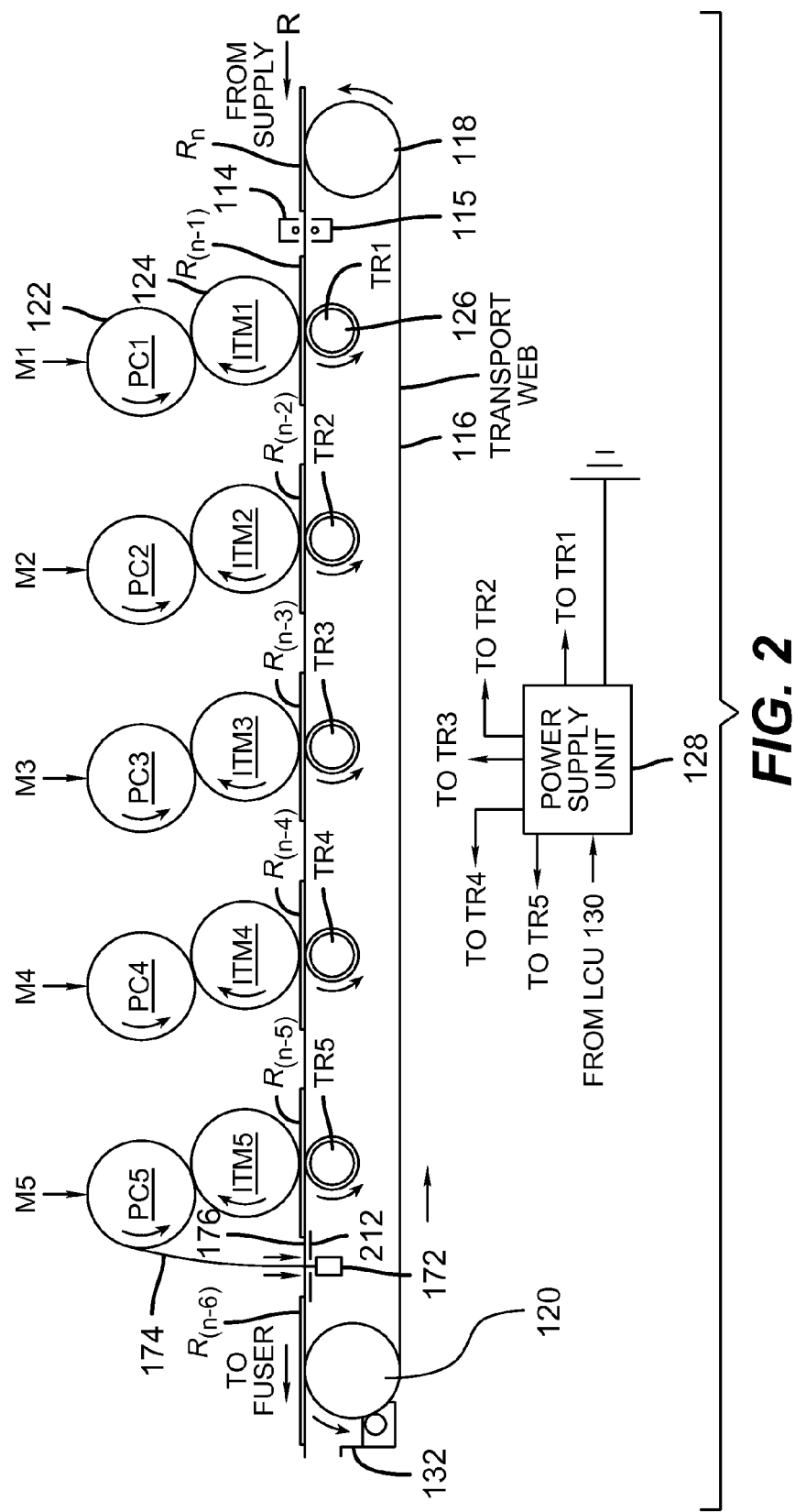
FIG. 2 is a schematic side elevational view, in cross section, of the reprographic image-producing portion of the electrographic reproduction apparatus of FIG. 1, on an enlarged scale.

Referring now to the accompanying drawings, FIGS. 1 and 2 are side elevational views schematically showing portions of a typical electrographic print engine or printer apparatus suitable for printing of multi-channel layered prints. One embodiment of the invention involves printing using an electrophotographic engine having five sets of single layer image producing or printing stations or modules arranged in tandem and an optional finishing assembly. The invention contemplates that more or less than five stations may be combined to deposit toner on a single receiver member, or may include other typical electrographic writers, printer apparatus, or other finishing devices.

An electrographic printer apparatus 100 has a number of tandemly arranged electrostatographic image forming printing modules M1, M2, M3, M4, and M5 and a finishing assembly 102. Additional modules may be provided.

Each of the printing modules generates a single-layer toner image for transfer to a receiver member successively moved through the modules. The finishing assembly has a fuser roller 104 and an opposing pressure roller 106 that form a fusing nip 108 there between. The finishing assembly 102 can also include a laminate application device 110. A receiver member R, during a single pass through the five modules, can have transferred, in registration, up to five single toner images to form a pentalayer image. As used herein, the term pentalayer implies that in an image formed on a receiver member combinations of subsets of the five layers are combined to form other layers on the receiver member at various locations on the receiver member, and that all five layers participate to form multiple layers in at least some of the subsets wherein each of the five layers may be combined with one or more of the other layers at a particular location on the receiver member to form a layer different than the specific layer toners combined at that location.

Receiver members (Rn-R(n-6), where n is the number of modules as shown in FIG. 2) are delivered from a paper supply unit (not shown) and transported through the printing modules M1-M5 in a direction indicated in FIG. 2 as R. The receiver members are adhered (e.g., preferably electrostatically via coupled corona tack-down chargers 114, 115) to an endless transport web 116 entrained and driven about rollers 118, 120. Each of the printing modules M1-M5 similarly includes a photoconductive imaging roller, an intermediate transfer member roller, and a transfer backup roller. Thus in printing module M1, a toner separation image can be created on the photoconductive imaging roller PC1 (122), transferred to intermediate transfer member roller ITM 1 (124), and transferred again to a receiver member moving through a transfer station, which includes ITM1 forming a pressure nip with a transfer backup roller TR1 (126).

Similarly, printing modules M2, M3, M4, and M5 include, respectively: PC2, ITM2, TR2; PC3, ITM3, TR3; PC4, ITM4, TR4; and PC5, ITM5, TR5. A receiver member, Rn, arriving from the supply, is shown passing over roller 118 for subsequent entry into the transfer station of the first printing module, M1, in which the preceding receiver member R(n-i) is shown. Similarly, receiver members R n-2) R(n) R(n-4), and R<n-5) are shown moving respectively through the transfer stations of printing modules M2, M3, M4, and M5. An unfused image formed on receiver member R (n-6) is moving, as shown, towards one or more finishing assemblies 102 including a fuser, such as those of well known construction, and/or other finishing assemblies in parallel or in series that includes, preferably a lamination device 110 (shown in FIG. 1). Alternatively the lamination device 110 can be included in conjunction to one of the print modules, Mn, which in one embodiment is the fifth module M5.

A power supply unit 128 provides individual transfer currents to the transfer backup rollers TR1, TR2, TR3, TR4, and TR5 respectively. A logic and control unit 130 (FIG. 1) in response to signals from various sensors associated with the electrophotographic printer apparatus 100 provides timing and control signals to the respective components to provide control of the various components and process control parameters of the apparatus in accordance with well understood and known employments. A cleaning station 132 for transport web 116 is also typically provided to allow continued reuse thereof.

Figure 3:
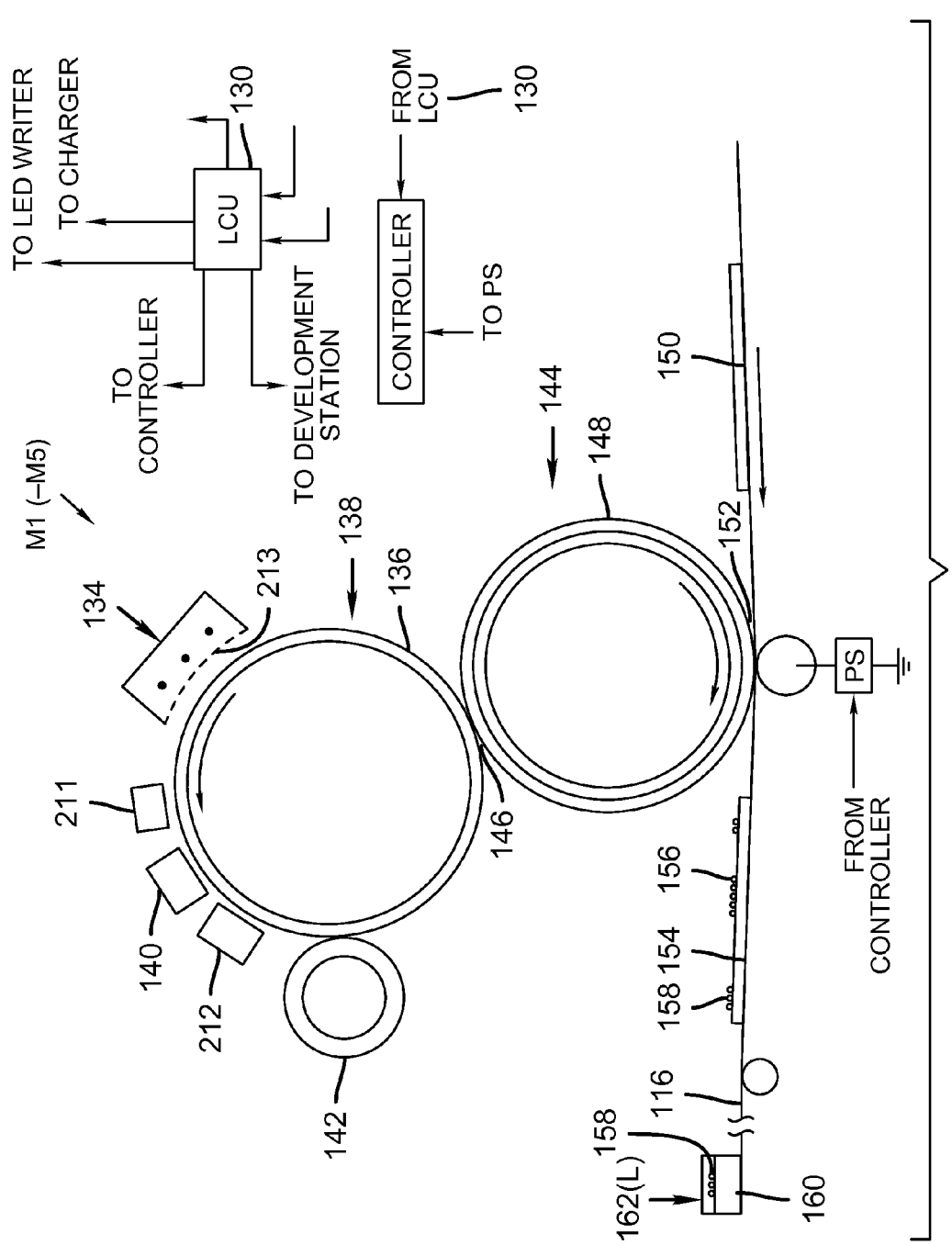
FIG. 3 is a schematic side elevational view, in cross section, of one printing module of the electrographic reproduction apparatus of FIG. 1, on an enlarged scale.

With reference to FIG. 3 wherein a representative printing module (e.g., M1 of M1-M5) is shown, each printing module of the electrographic printer apparatus 100 includes a plurality of electrographic imaging subsystems for producing one or more multilayered image or pattern. Included in each printing module is a primary charging subsystem 134 for uniformly electrostatically charging a surface 136 of a photoconductive imaging member (shown in the form of an imaging cylinder 138). An exposure subsystem 140 is provided for image-wise modulating the uniform electrostatic charge by exposing the photoconductive imaging member to form a latent electrostatic multi-layer (separation) image of the respective layers. A development station subsystem 142 serves for developing the image-wise exposed photoconductive imaging member. An intermediate transfer member 144 is provided for transferring the respective layer (separation) image from the photoconductive imaging member through a transfer nip 146 to the surface 148 of the intermediate transfer member 144 and from the intermediate transfer member 144 to a receiver member (receiver member 150 shown prior to entry into the transfer nip 152 and receiver member 154 shown subsequent to transfer of the multilayer (separation) image) which receives the respective (separation) images 156 in superposition to form a composite image 158 thereon.

Receiver member 160 shown subsequent to the transfer of an additional layer 162 that can be, in one embodiment, a laminate L.

The logic and control unit (LCU) 130 shown in FIG. 3 includes a microprocessor incorporating suitable look-up tables and control software, which is executable by the LCU 130. The control software is preferably stored in memory associated with the LCU 130. Sensors associated with the fusing assembly provide appropriate signals to the LCU 130. In response to sensors S, the LCU 130 issues command and control signals that adjust the heat and/or pressure within fusing nip 108 and otherwise generally nominalizes and/or optimizes the operating parameters of finishing assembly 102 (see FIG. 1) for printing multi-channeled layers in an image 158 on a substrate for a print.

Subsequent to transfer of the respective (separation) multilayered images, overlaid in registration, one from each of the respective printing modules M1-M5, the receiver member is advanced to a finishing assembly 102 (shown in FIG. 1) including one or more fusers 170 to optionally fuse the multilayer toner image to the receiver member resulting in a receiver product, also referred to as a final multi-channeled layer print 175. The finishing assembly 118 may include a sensor 172, an energy source 174 and one or more laminators 110. This can be used in conjunction to a registration reference 176 as well as other references that are used during deposition of each layer of toner, which is laid down relative to one or more registration references, such as a registration pattern.

The laminator 110 may be placed such that the laminate 162 is laid down prior to fusing or after the initial fusing. In one embodiment the apparatus of the invention uses a laminate in one or more layers.

The laminate, in one embodiment, can have a thickness that is greater then the largest toner particle and sufficient to prevent occlusion of the channel in the multi-channeled network. It is important that the laminate, also sometimes referred to as an adhesive film, can go onto of EP created channels without remelting the toner channels.

In one embodiment the material will have residual fusing oil on top, not all adhesive works well in an oiled environment. In that environment the laminate basically has oil absorption capability, so the lamination can be done uniformity on EP printed images. The idea here is 3-D channels (bottom and sides) can be created either via larger toner particle build up as a feature, or via stamping (with features) on thermal remeldable surface, such as coated surfaces.

Alternately, as discussed above the surface texture can be applied early in the printing process. An example is stamping which is essentially a 2-D process. In all the processes it is necessary to close off the channels. Any process that allows the top layer to follow the features below will collapse the channels created and will not work. One workable means is to apply a laminate without too much pressure/heat applied in the finishing steps to created channels in the 10s micron range as described below.

Figure 4:
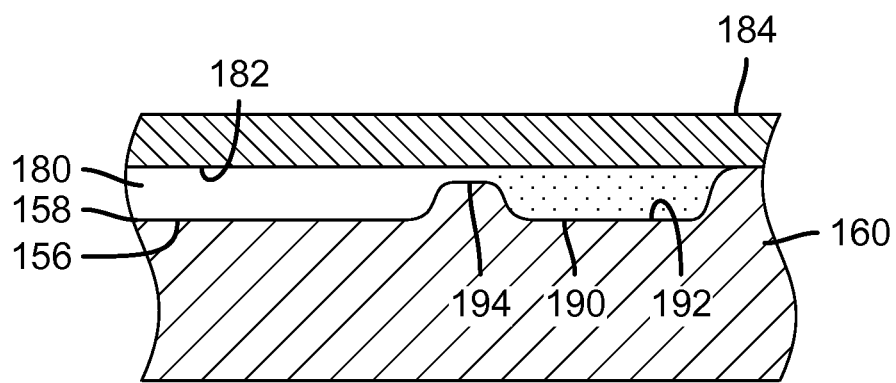
FIG. 4 is a schematic side elevational view, in cross section, of a print, produced by the invention.
Figure 5:
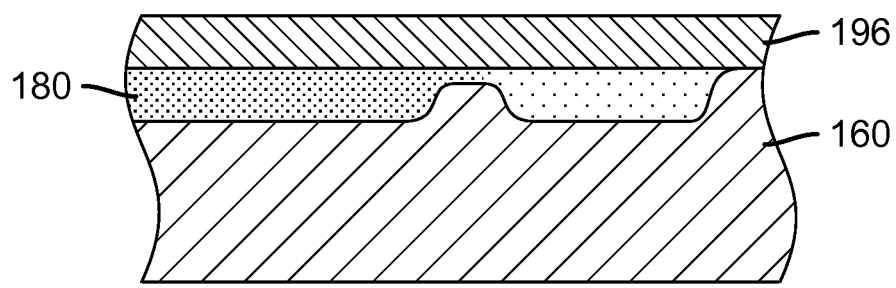
FIG. 5 is a schematic side elevational view, in cross section, of an activated print, having the predetermined multidimensional pattern formed in layers sufficient to form the final predetermined multi-channeled layers produced by the invention.

The use of laminates can also improve abrasion resistance, add various types of gloss and perform other advantages besides forming the top of a channeled network or array. It is necessary for the laminate, or an adhesive film used as a laminate, to have the structural integrity and thickness, as discussed above, to go onto electro photographic created channels without filling the channel when there are finishing actions, such as fusing, which is a remelting of the toner around the channels or the use of fusing oil on top. The laminate must work well in such an environment. One such laminate film is useful for this invention in an electro photographic digital printer and the laminate also has oil absorption capability, so the lamination can be applied uniformly to electro photographic printed images. One such laminate material is a laminate, such as Laminate GBC Layflat with a thickness of 37 um (micron) is useful for this application since the thickness is on the order of magnitude of the desired channel width of 10-50 urn that are large enough to allow the toner of less than 8 um to flow. By controlling the laminate thickness the channel is not occluded by distended laminate that would block the channel. A multiple-channeled layer 180 includes one or more aerially placed channels 182 of variable width but consistent thickness formed on the receiver 160, as shown in FIG. 4. There may be layers of toner laid down between the receiver 160 and the multiple-channeled layer 180. The multiple-channeled layers 180, including the channels 182, are formed prior to the application of a laminate 184. The channel may also include a node 190 that is filled with a movable material 192, such as a fluid or pigment, as well as a narrowed section 194 formed as part of the channel 182. The multiple-channeled layer 180 is capped in one of a few ways including the application of the laminate 184 as described below or laid down as a top layer 196 as shown in FIG. 5, in one or more layers on top of the multiple-channeled layer 180.

The multiple-channeled layer 180 can be made using a larger particle or a chemically prepared toner (CDI) that is useful in building up as a feature as described in U.S. Publication 2008/0159786.

The multiple-channeled layer 180 may also be formed as an embossed or varied surface via stamping (with features) on thermal remeldable surface, such as CDI coated surfaces. Two dimension embossing or stamping can create the desired structures needed before the laminate 184 is applied to the multiple-channeled layer 180. Alternatively the paper can have a surface that varies for other reasons that would contribute to the channels structure including a pretreated paper, a paper of higher clay content or having other surface additives that in certain circumstances and conditions achievable in the printing cycle would change the surface profile to form a channel or channels having a pattern, such as a variable and/or periodic pattern.

If the top layer 196 is to be laid down to close off the multiple-channeled layer 180 it involves more then just coating the channel structure with toner such as chemically prepared dry ink (CDI) or an inkjet. The use of different treatable materials must be used so that the finishing processes, including fusing, will not follow the features below and collapse the channels created. If these do not exceed the melting conditions of the top layers needed to create channels, then the multiple-channeled layer 180 will be effectively intact in the final multiple-channeled layer print 160.

Figure 6:
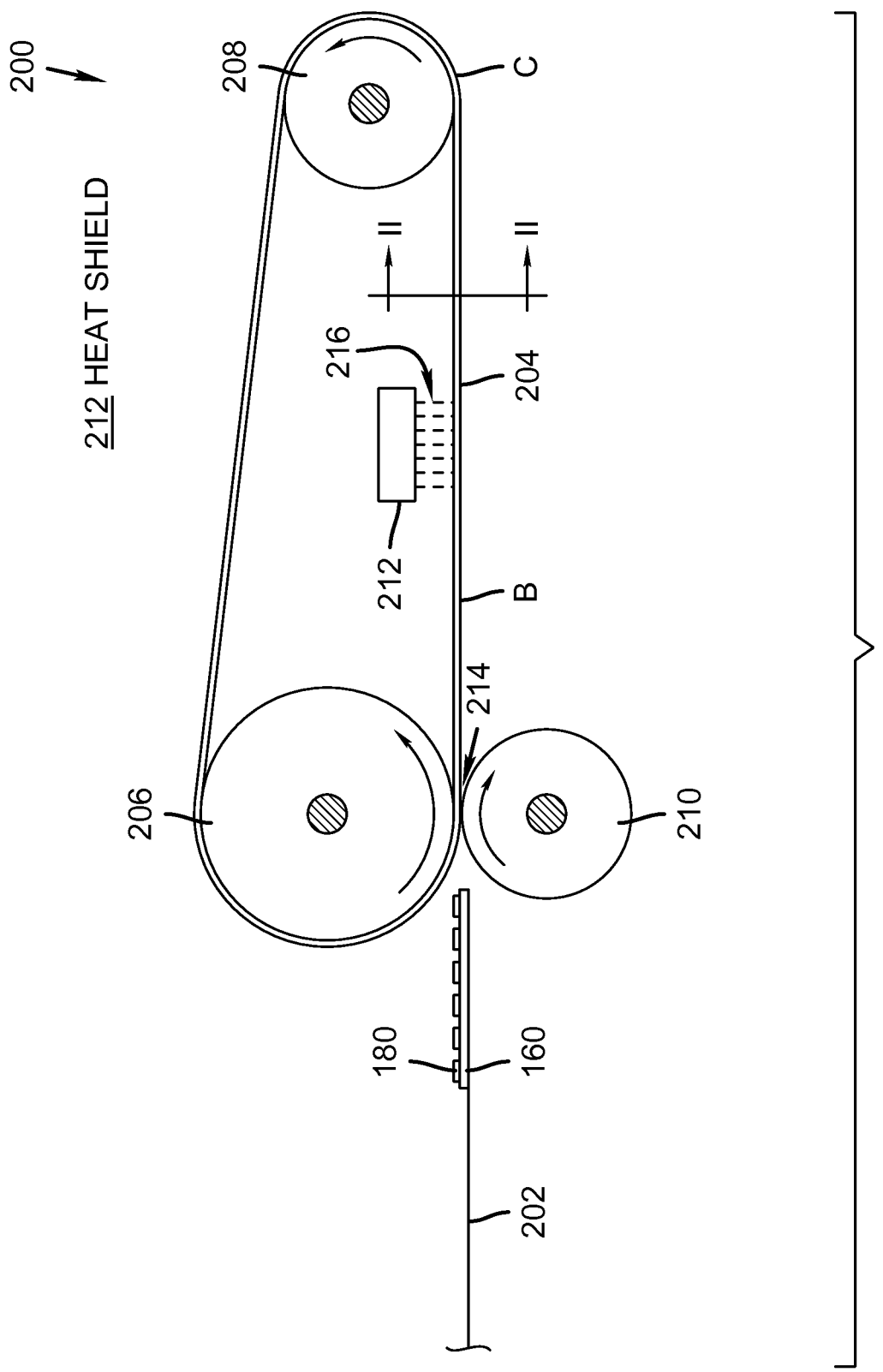
FIG. 6 is a schematic of a portion of the invention of FIG. 1.

One embodiment of the finishing assembly 102 that would allow the top layer to be applied during the fifth module is a type of finishing device 200 shown in FIG. 6. The multiple-channeled layer 180, along with one or more image layers, is transported along a path 202 to the finishing device. The finishing device includes a finishing or fusing belt 204, an optional heated glossing roller 206, a steering roller 208, and a pressure roller 210, as well as a heat shield 212.

The fusing belt 204 is entrained about glossing roller 206 and steering roller 208.

The fusing belt 204 includes a release surface of an organic/inorganic glass or polymer of low surface energy, which minimizes adherence of toner to the fusing belt 204. The release surface may be formed of a silsesquioxane, through a sol-gel process, as described for the toner fusing belt disclosed in U.S. Pat. No. 5,778,295, issued on Jul. 7, 1998, in the names of Jiann-Hsing Chen et al. Alternatively, the fusing belt release layer may be a poly (dimethylsiloxane) or a PDMS polymer of low surface energy, see in this regard the disclosure of U.S. Pat. No. 6,567,641, issued on May 20, 2003, in the names of Muhammed Aslam et al. Pressure roller 210 is opposed to, engages, and forms glossing nip 214 with heated glossing roller 206. Fusing belt 204 and the image bearing receiving member are cooled, such as, for example, by a flow of cooling air, upon exiting the glossing nip 214 in order to reduce offset of the image to the finishing belt 204. Alternately the finishing device could apply a laminate layer 184 and fuse that layer to the multiple-channeled layer 180.

The previously disclosed LCU 130 includes a microprocessor and suitable tables and control software which is executable by the LCU 130. The control software is preferably stored in memory associated with the LCU 130.

Sensors associated with the fusing and glossing assemblies provide appropriate signals to the LCU 130 when the finishing device or laminator is integrated with the printing apparatus. In any event, the finishing device or laminator can have separate controls providing control over temperature of the glossing roller and the downstream cooling of the fusing belt and control of glossing nip pressure. In response to the sensors, the LCU 130 issues command and control signals that adjust the heat and/or pressure within fusing nip 108 so as to reduce image artifacts which are attributable to and/or are the result of release fluid disposed upon and/or impregnating a receiver member that is subsequently processed by/through finishing device or laminator 110, and otherwise generally nominalizes and/or optimizes the operating parameters of the finishing assembly 102 for receiver members that are not subsequently processed by/through the finishing device or laminator 110.

Figure 8:
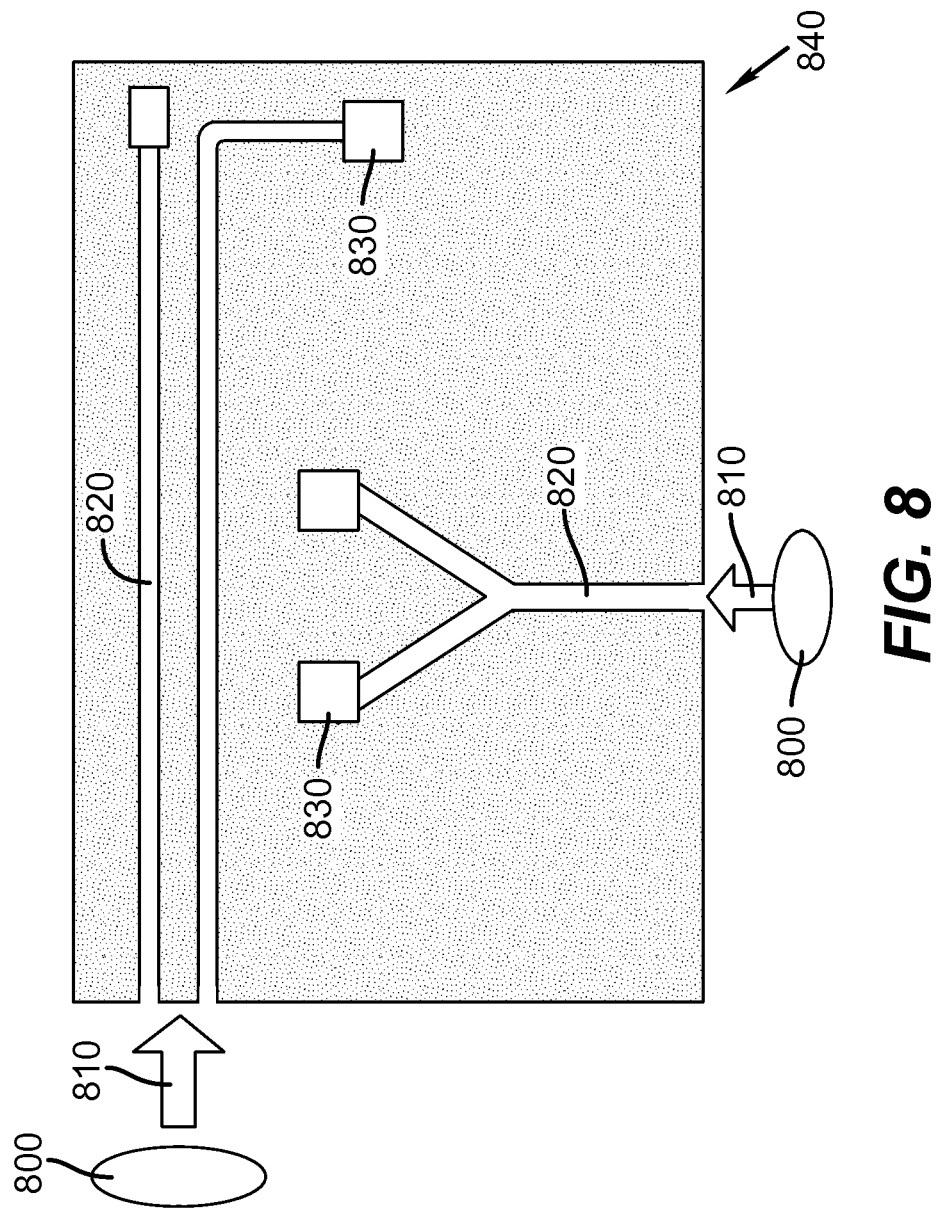
FIG. 8 is a schematic side view of a waveguide, produced by the method of FIG. 7.
Figure 9:
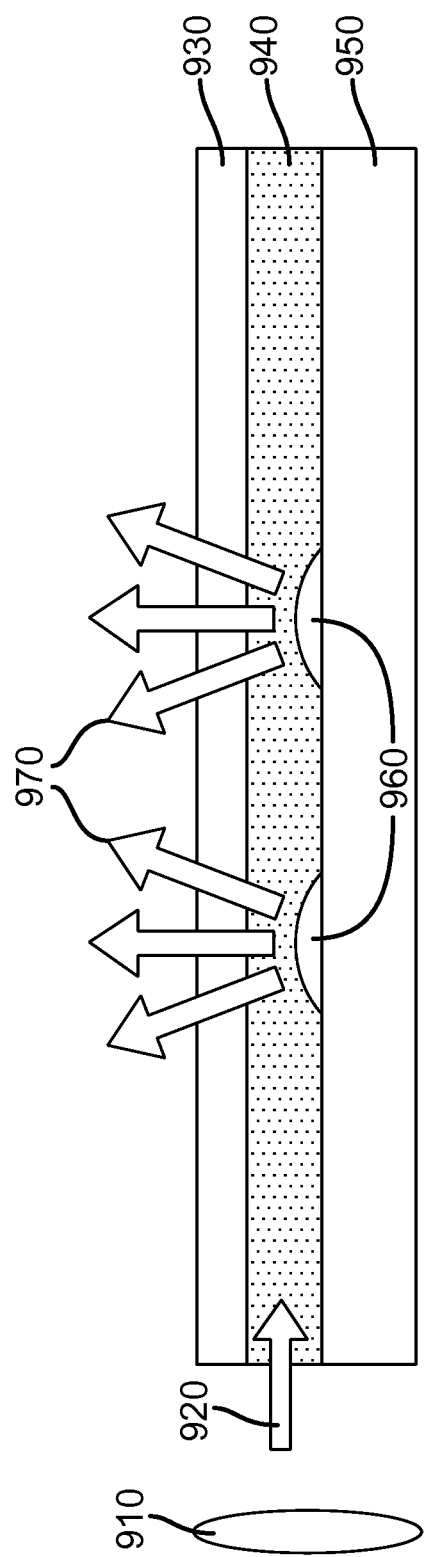
FIG. 9 is a schematic side view of a waveguide, produced by a modification of the method of FIG. 7.

A few final multi-channeled layer prints 175 that are formed on the receiver member are shown in FIGS. 8 and 9. FIG. 8 shows a top view of a final multi-channeled print with the pattern P of the channels shown for ease of understanding. FIG. 9 shows a final multi-channeled layers with the layers from the side.

The toner used to form the final multi-channeled layers can be styrenic (styrene butyl acrylate) type used in toner with a polyester toner binder. Typically the refractive index of the polymers used as toner resins are 1.53 to almost 1.6. These are typical refractive index measurements of the polyester toner binder, as well as styrenic (styrene butyl acrylate) toner. Typically the polyesters are around 1.54 and the styrenic resins are 1.59. The conditions under which it was measured (by methods known to those skilled in the art) are at room temperature and about 590 nm. One skilled in the art would understand that other similar materials could also be used. These could include both thermoplastics such as the polyester types and the styrene acrylate types as well as PVC and polycarbonates, especially in high temperature applications such as projection assemblies. One example is an Eastman Chemical polyester-based resin sheet, Lenstar™, specifically designed for the lenticular market. Also thermosetting plastics could be used, such as the thermosetting polyester beads prepared in a PVA1 stabilized suspension polymerization system from a commercial unsaturated polyester resin at the Israel Institute of Technology.

The toner used to form the final predetermined pattern is affected by the size distribution so a closely controlled size and pattern is desirable. This can be achieved through the grinding and treating of toner particles to produce various resultants sizes. This is difficult to do for the smaller particular sizes and tighter size distributions since there are a number of fines produced that must be separated out. This results in either poor distributions and/or very expensive and poorly controlled processes. An alternative is to use a limited coalescence and/or evaporative limited coalescence techniques that can control the size through stabilizing particles, such as silicon. These particles are referred to as chemically prepared dry ink (CDI) below. Some of these limited coalescence techniques are described in patents pertaining to the preparation of electrostatic toner particles because such techniques typically result in the formation of toner particles having a substantially uniform size and uniform size distribution. Representative limited coalescence processes employed in toner preparation are described in U.S. Pat. No. 4,965,131, which is hereby incorporated by reference. In one example a pica high viscosity toner, of the type described above, could form the first and or second layers and the top layer could be a laminate or an 8 micron clear toner in the fifth station thus the highly viscous toner would not fuse at the same temperature as the other toner.

In the limited coalescence techniques described, the judicious selection of toner additives such as charge control agents and pigments permits control of the surface roughness of toner particles by taking advantage of the aqueous organic interphase present. It is important to take into account that any toner additive employed for this purpose that is highly surface active or hydrophilic in nature may also be present at the surface of the toner particles.

Particulate and environmental factors that are important to successful results include the toner particle charge/mass ratios (it should not be too low), surface roughness, poor thermal transfer, poor electrostatic transfer, reduced pigment coverage, and environmental effects such as temperature, humidity, chemicals, radiation, and the like that affects the toner or paper. Because of their effects on the size distribution they should be controlled and kept to a normal operating range to control environmental sensitivity.

This toner also has a tensile modulus (103 psi) of 350-1020, normally 345, a flexural modulus (103 psi) of 300-500, normally 340, a hardness of M70-M72 (Rockwell), a thermal expansion of 68-70 10 6/degree Celsius, a specific gravity of 1.2 and a slow, slight yellowing under exposure to light.

This toner also has a tensile modulus (103 psi) of 150-500, normally 345, a flexural modulus (103 psi) of 300-500, normally 340, a hardness of M70-M72 (Rockwell), a thermal expansion of 68-70 10 6/degree Celsius, a specific gravity of 1.2 and a slow, slight yellowing under exposure to light according to J. H. DuBois and F. W. John, eds., in Plastics, 5th edition, Van Norstrand and Reinhold, 1974 (page 522).

In this particular embodiment various attributes make the use of this toner a good toner to use. In any contact fusing the speed of fusing and resident times and related pressures applied are also important to achieve the particular final desired multi-channeled layers. Contact fusing may be necessary if faster turnarounds are needed. Various finishing methods would include both contact and non-contact including heat, pressure, chemical as well as IR and UV.

The described toner normally has a melting range can be between 50-300 degrees Celsius. Surface tension, roughness and viscosity should be such as to yield a better transfer. Surface profiles and roughness can be measured using the Federal 5000 "Surf Analyzer' and is measured in regular unites, such as microns. Toner particle size, as discussed above is also important since larger particles not only result in the desired heights and patterns but also results in a clearer multi-channeled layers since there is less air inclusions, normally, in a larger particle. Toner viscosity is measured by a Mooney viscometer, a meter that measures viscosity, and the higher viscosities will keep an multi-channeled layer's pattern better and can result in greater height. The higher viscosity toner will also result in a retained form over a longer period of time.

Melting point is often not as important of a measure as the glass transition temperature (Tg), discussed above. This range is around 50-100 degrees Celsius, often around 118 degrees Celsius. Clarity, or low haze, is important for multi-channeled layers that are transmissive or reflective wherein clarity is an indicator and haze is a measure of higher percent of transmitted light.

Another embodiment for creating the final multi-channeled layer 180 includes using a patterned paper (like an embossed paper with a specific pattern) and/or pretreated paper. Alternately a patterned roller could be used on the print prior to application of the top layer, along with a non-contact fusing, using a high MW polymer or high viscosity polymer that would not fuse like regular toner and probably a particle size much smaller than normal toner, also possibly metallic toner particles etc. Some papers, such as clay papers, actually will form a channel when heated at a higher temperature, such as during normal during fusing. The use of a clapper with clay content could be used along with a very smooth surface roller to create tiny blisters or micro spaces desired for this embodiment. The regulation of the heat and pressure would be used to control the size and shape of the multi-channels that would become the expansion spaces.

Their size would be varied by the application of different amounts of heat and for different lengths of time and in conjunction with different pressures, preferably a low pressure.

In all of these approaches, a toner may be applied to form the final multi-channeled layers desired. It should be kept in mind that texture information corresponding to the toner image plane need not be binary. In other words, the quantity of clear toner called for, on a pixel by pixel basis, need not only assume either 100% coverage or 0% coverage; it may call for intermediate "gray level" quantities, as well.

Figure 7:
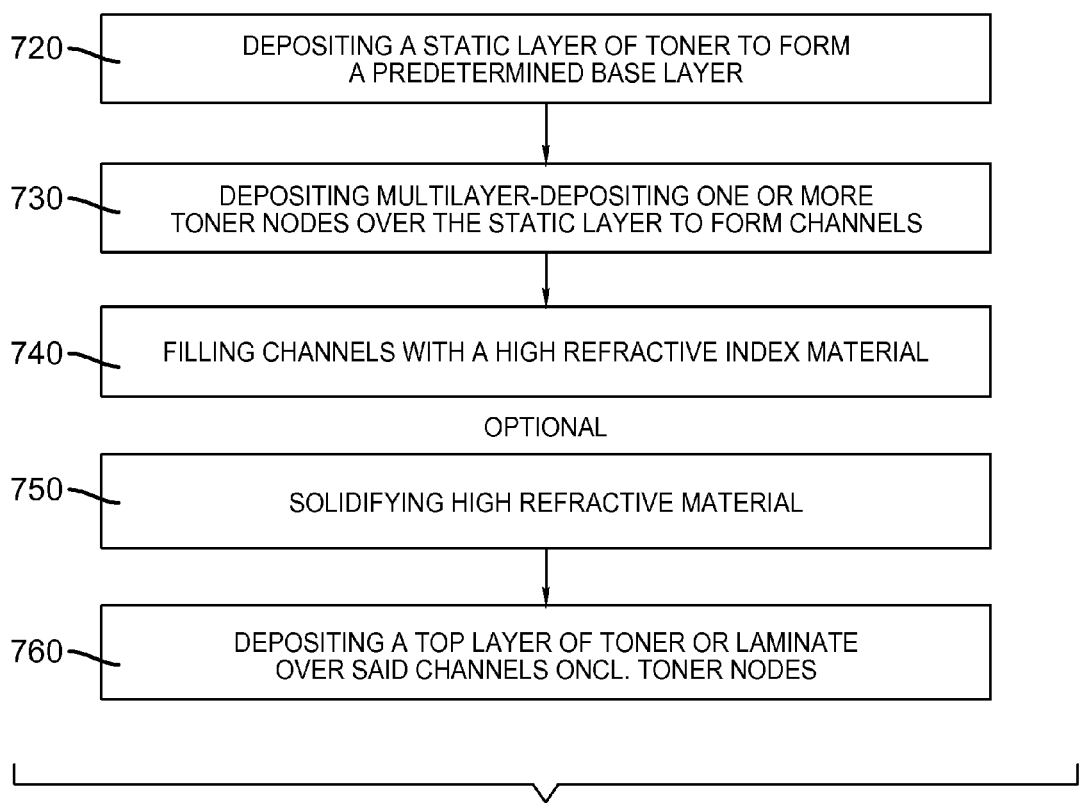
FIG. 7 is an embodiment of a method printing an optical waveguide

Referring to FIG. 7 we see the flow chart of the method 710 for print methods for producing a electrographically produced variable optical waveguide structure. In the first step 720 a static layer of toner is deposited to form a predetermined base layer. In the second step 730, multiple layers of toner nodes are deposited over the static layer to form channels. In the third step 740, the channels are filled with a high refractive index material.

In optional step one 750 the high refractive index material is solidified and/or uniformized. If the material was particulate, melting to remove low index material may be necessary. In optional step two 760, a top layer of toner or laminate is applied for protection or form maintaining a uniform light retaining interface.

The channels which have been formed in the prior steps are filled with a fluid. This fluid has a higher refractive index than any of the channel wall or substrate. The exact nature of the fluid material will depend on the substrate and wall material. Example high refractive index materials include polyvinyl carbozole, Poly(pentabromophenyl acrylate, Poly(pentabromophenyl methacrylate), Poly(vinyl phenyl sulfide), Pentabromophenyl methacrylate. Pentabromophenyl acrylate, and inorganic composite material such as $TiO_2$ nanocomposites. These materials can be applied as a liquid or as a powder. If the material is applied as a powder then a post fusing will be necessary to remove scattering centers. A preferred embodiment is to apply the polymer as its monomer and polymerize in situ. The initiator for polymerization can be heat sensitive or photosensitive and it will be appreciated that the exact nature will depend on the application and polymer desired.

Capping of the waveguide device is desirable to avoid scratches and other damages which may degrade the usefulness of the waveguide. To accomplish this, the fluid can be capped before or after solidification. If capping is conducted before solidification, lamination is the preferred method as it is simpler to bridge the channels. In this case the lamination must be conducted carefully to prevent gas incorporation of air bubbles, which can act as scattering centers. The main consideration of the capping layer is that it possess a low refractive index to trap the light in the waveguide.

The capping can also be conducted by depositing particles such as a toner by a process such as electrography or direct blade coating. In this case it would be desirable to have solidified the polymer in the channels such that mixing of the particles and the monomer can not occur. The particles are then fused by heat or solvent to create a uniform non-scattering layer.

The capping can also be conducted by coating a liquid by methods well known in the art such as blade or hopper coating. After the coating the capping layer is solidified by drying, crosslinking, or polymerization.

It will be recognized that the capping layer is not necessary for optical waveguide function. Ai is a very low index material and will act to contain the optical power. There may be applications where no capping layer is necessary.

The waveguides formed have many uses. One preferred embodiment is for distribution for sensors or computation. Referring to FIG. 8, light 810 from a light source 800 is directed into the edge of the waveguide device 840, and the channels 820 direct the light to sensors 830. The light source 800 can be due to an embedded or laminated light emitter such as an OLED or LED or maybe directed from an off device source such as a laser.

The sensor 830 can also be on board or located at the exit of the device. If located at the exit it will be efficiently coupled to the waveguide either by being close or through an external arrangement of lenses.

Another preferred embodiment is as a light distributor for backlit displays. Referring to FIG. 9, the light 920 from a light source 910 is coupled into the waveguide channel 940 on substrate 950. The light is then channeled to scattering structures 960 to exit out of the waveguide through the top layer 930 resulting in exit light 970 of the appropriate uniformity and direction. These light exits from the channels are constructed so that uniform light is emitted to impinge on the LCD or other modulating device.

The invention has been described in detail with particular reference to certain preferred embodiments thereof, but it will be understood that variations and modifications can be effected within the spirit and scope of the invention. For example, the electron transporting layer can be a single inorganic layer or an inorganic layer with a underlying organic layer.

What is claimed is:

1. A printing method of manufacturing a waveguide device comprising:
   depositing a first layer of toner to form a base layer;
   depositing a second layer of toner on the base layer to form a pattern of channels extending from openings at one edge of the second layer to exits on the device;
   filling the channels with a higher index of refraction material;
   depositing a top layer of laminate over the pattern of channels; and
   fusing the deposited first and second toner layers so that the laminate adheres to the fused toner of the second layer to provide an interface around the channel;
   wherein the higher index of refraction material has a higher index of refraction than the toner and the laminate, so that light that is injected into the higher index of refraction material from the opening in a direction that is approximately parallel to the channels will hit an interface between the higher index of refraction material and the fused toner and laminate only at high angles to cause the light to reflect within the channels and exit the channels through the exits on the device.

2. The method of claim 1, said filling further comprising adding a low refractive index in contact with the high index refractive material.

3. The method of claim 1, further comprising laying down the first and second layer of toner simultaneously.

4. The method of claim 1, wherein channels extend to form one or more indicia.

5. The method of claim 1, wherein said pattern of toner channels has uniform channels.

6. The method of claim 1, wherein the second layer further comprises expansion spaces proximate the openings for the channels that are shaped to receive-one or more of an embedded light source or a laminated light source.

7. The method of claim 1, wherein the particular size distribution of particles of toner used for the first layer comprises a volume average diameter of 10-30 microns for the first layer and a volume average diameter of 6-8 microns for the overcoat second layer.

* * * * *